US006966569B2

(12) United States Patent
Miyoshi

(10) Patent No.: US 6,966,569 B2
(45) Date of Patent: Nov. 22, 2005

(54) WHEELCHAIR

(75) Inventor: Etsuo Miyoshi, Higashikagawa (JP)

(73) Assignee: Swany Corporation, Higashikawa (JP)

( * ) Notice: Subject to any disclaimer, the term of this patent is extended or adjusted under 35 U.S.C. 154(b) by 114 days.

(21) Appl. No.: 10/720,083

(22) Filed: Nov. 25, 2003

(65) Prior Publication Data

US 2004/0135340 A1 Jul. 15, 2004

(30) Foreign Application Priority Data

Nov. 26, 2002 (JP) ....................................... 2002-343026
Nov. 7, 2003 (JP) ....................................... 2003-379091

(51) Int. Cl.[7] ................................................ B62M 1/14
(52) U.S. Cl. .................................................... 280/250.1
(58) Field of Search ............................ 301/95.105, 53; 280/250.1, 304.1, 242; 297/DIG. 4; 74/552, 558

(56) References Cited

U.S. PATENT DOCUMENTS 2,938,738 A * 5/1960 Borup et al. ................ 280/249
4,366,964 A * 1/1983 Farey et al. ............. 280/250.1
4,593,929 A * 6/1986 Williams .................... 280/650
4,687,218 A * 8/1987 Okamoto ................. 280/250.1
4,770,432 A * 9/1988 Wagner ................... 280/250.1
5,028,065 A 7/1991 Danecker
5,160,156 A * 11/1992 Mendon .................. 280/250.1
5,379,866 A * 1/1995 Pearce et al. ............... 188/2 F
5,603,520 A * 2/1997 Pearce ...................... 280/250.1
5,927,739 A * 7/1999 Evling ...................... 280/250.1
5,944,390 A * 8/1999 Parenzuela ................... 301/58
6,120,047 A * 9/2000 Axelson et al. .......... 280/250.1
6,241,268 B1 6/2001 Niklasson
6,241,321 B1 * 6/2001 Gagnon ................. 301/64.704
6,276,705 B1 * 8/2001 Baldwin et al. ......... 280/250.1

FOREIGN PATENT DOCUMENTS

DE 198 47 535 6/2000
EP 0 363 780 4/1990
JP 11-347072 12/1999

* cited by examiner

*Primary Examiner*—Lesley D. Morris
*Assistant Examiner*—Paul Royal, Jr.
(74) *Attorney, Agent, or Firm*—Wenderoth, Lind & Ponack, L.L.P.

(57) ABSTRACT

A wheel including a rim member (20), and a hub member (22) which is connected to a center of the rim member via a wheel part (21). The wheel is rotatably connected to a chair part (1). The wheel fixes a cushion ring 26 on the outer periphery of the rim member (20), and has a continuous wall portion (31) on an outside portion of the outer periphery. The continuous wall portion (31) is shaped in form of a ring along the rim member (20), and provides a grip ring (27) on an edge portion thereof. The wheel provides a finger-holding cavity (32) which is formed by the continuous wall portion (31).

19 Claims, 17 Drawing Sheets

WHEELCHAIR

BACKGROUND OF THE INVENTION

1. Field of the Invention

The present invention relates to a wheelchair with a chair part and wheels provided on both sides of the chair part, allowing a user who sits on the chair to move himself by rotating the wheels using his own hands.

2. Description of the Related Art

A current used wheelchair has a wheel which fixes a hub via spokes on a rim fixing a tire around thereon, and a metal ring is fixed on the outer side of the rim. The metal ring has a smaller diameter than the tire, and is spaced apart from the rim to permit it to be easily grasped to drive the wheel. To separate the metal ring from the rim, the metal ring is fixed by arm located in a predetermined space in order to fix the rim.

In use of the wheelchair having this construction, a user grasps the metal ring and rotates the wheel. But the users hand can hit the arm causing pain and discomfort. To prevent his hand from hitting the arm while driving the wheel, it is necessary for user to keep his hand away from the metal ring after he rotates the wheel by grasping the metal ring. It is impossible to drive the wheel by keeping his hand on or around the metal ring.

To prevent this drawback, another wheelchair was developed in which a disk is fixed on the outside of the wheel (see Japanese Patent Laid Open No. 11-347072). The wheelchair disclosed in this reference has a disk 41 fixed on the outside of the wheel 40, and a protruding portion 42 is provided on an outer periphery of the disk 41 to permit it to be gripped by hand.

The wheel 40 for the wheelchair shown in FIG. 1 is used to drive the wheel 40 by grasping the protruding portion 42 of the disk 41 that is fixed outward of the wheel 40. Since this wheel 40 with this structure has such drawbacks that it easily slips since the protruding portion 42 on the wheel 40 is gripped on both the upper side and the lower side by hand. Further, if a user grips protruding portion 42 hard to prevent slipping, then his hand gets fatigued easily. Moreover, the wheel 40 with such construction has the disk 41 fixed to the rim 43 and the protruding portion 42 protrudes outwardly from this disk 41. This configuration causes a wider size of the whole wheel, and it would be difficult to move in a small room smoothly because of the wide side. Also, another wheelchair in the related art having a wheel with a metal ring has similar drawbacks, i.e., its metal ring protrudes outwardly, thereby resulting in a wider size of the wheel. Also, it would be difficult to smoothly move in the small room.

SUMMARY OF THE INVENTION

The present invention was developed for the purpose of solving such drawbacks. An important object of the present invention is to provide a wheelchair which comfortably drives wheels so as to prevent the user's hand from hurting, and easily drives wheels allowing light griping without slip. Another important object of the present invention is to provide a wheelchair with a smaller wheel width, thereby achieving easy and smooth movement even in a small room. A further important object of the present invention is to provide a wheelchair which has simple structure, which is good for mass production with lower costs.

The wheelchair of the present invention drives wheels for movement rotating by hand of a user who sits on a chair part. The wheel comprises a rim member, a hub member which is connected to the center of the rim member via a wheel and is rotatably connected to a chair part. The wheel fixes a cushion ring on the outer periphery of the rim member, and has a continuous wall portion on the outside of the outer periphery. This continuous wall portion is shaped in ring form along the rim member, and provides a grip ring on the edge portion. The wheelchair defines a finger-holding cavity for which the user inserts his finger into the finger-holding cavity and grips the grip ring to then rotate the wheel.

The wheelchair with this construction has an advantageous effect that a user uses it comfortably without any hurt of his hand when rotating the wheel, and easily drives the wheels without slip by holding lightly. This is because that this wheelchair has unique configuration which provides grip ring on the rim member of the wheel to drive the wheel by holding the grip ring. The wheelchair with this configuration has the continuous wall portion on the outside of the outer periphery of the wheel. This continuous wall portion is shaped in ring shape along the rim member. The grip ring is provided on its edge portion. By employing this configuration, it is not necessary to provide partially connecting arms like conventional wheelchair. Because the grip ring is connected to the wheel via continuous wall portion, even if connecting member which connects the grip ring with the wheel hits a user's hand, it does not hurt thereby comfortably usable. Further, according to the wheelchair with this configuration, a continuous wall portion forms finger-holding cavity is formed by the continuous wall portion having the grip ring on the edge portion. Since a user can insert his finger into the inside of the finger-holding cavity, he can hold the grip ring easily, lightly, but even firmly, and it is easy to drive the wheel.

Further, the wheelchair of the present invention preferably has a rim member of the wheel in U shape of radially cut cross sectional form. This rim member has a configuration which connects inner sidewall locating the chair side with the opposing outer sidewall via a connecting ring. The outer sidewall forms a continuous wall portion. The rim member fixes a cushion ring on outer side of the connecting ring. Also it connects inner sidewall with a wheel portion and provides the grip ring on the edge of the outer sidewall. A U-shaped part comprising inner sidewall, connecting ring and outer sidewall forms finger-holding cavity.

Because this wheelchair has the rim member of the outer periphery of the wheel formed in U-shape of the cross sectional form by connecting the inner sidewall located in the chair side with the opposing outer sidewall via connecting ring, unlike conventional wheelchair, it avoids wider wheel having such as a disk outside of the wheel, i.e., the invention achieves small width of the wheel allowing smooth movement even in a small room. Further, this wheelchair employs configuration for grip ring to be easily and lightly gripped by inserting user's finger into the inside of the U-shaped portion which is formed by the inner sidewall, outer sidewall and connecting ring, resulting in easy drive of the wheel.

The wheelchair of the present invention can form smooth surface of the inside of the U shaped part comprising the inner sidewall, outer sidewall and connecting ring, without pits or projections which touch user's hand nor gap along its rotation direction. Since this wheelchair removes stumbling objects such as pits, projections or gap from area which a user may touch his hand when in use, so even if user's hand touched this area, there is no troublesome object which may hurt the hand, thus comfortable use is realized.

In addition, the wheelchair can form smooth plate inside of the U-shaped part integrally. Further more, the wheelchair may form the rim member comprising the inner sidewall, outer sidewall, and connecting ring made by plastic. This wheelchair integrally forms the rim member made by plastic, achieving simple configuration and capable of mass production at lower cost.

The wheelchair may employ the configuration in which a rim member of a wheel comprises a ring part fixing a cushion ring on the outer periphery and a continuous wall portion provided on outer side of the ring part, thereby a finger-holding cavity may be formed by the continuous wall portion and ring part.

Furthermore, the wheelchair may employ the configuration of the outer side of the ring part and surface of the continuous wall portion as a surface having no pits, projections or gap those of which may interfere a user's hand in a direction of rotation. Since this wheelchair makes the area at which user's hand may touch something as the area which no pits, projection nor gap might touch user's hand, even if user touched this area, he would not troubled by hurting his hand, resulting in comfortable use.

Still, the wheelchair makes the ring part and a continuous wall portion molded integrally by a plastic to make the wheel simple structure. Because this wheelchair integrally forms the ring part and continuous wall portion by plastic, it is easy and less expensive to produce the wheel.

The wheelchair may curve or angled the continuous wall portion against the center of the wheel and provide the grip ring to the center side from the outer periphery of the rim member to locate the grip ring on the edge by elongating the continuous wall portion without enlarging the width of the wheel. Such configuration with longer continuous wall portion and grip ring located on the edge allows finger-holding cavity deeper to grip the grip ring firmly and easily.

The wheelchair with the continuous wall portion which the maximum thickness (D) of the grip ring larger than the minimum thickness (d) of a connecting portion of the outer periphery of the wheel and grip ring allows firm gripping of the grip ring.

The wheelchair can mold the rim member except the cushion ring and wheel part and hub member in a plastic uniformly. The cushion ring can also be formed a rubber ring. Still further, the wheelchair may curve the wheel portion from rim member to hub member to make the width of the whole wheel narrow.

The above and further objects and features of the invention will be more fully apparent from the following detailed description along with the accompanying drawings.

DETAILED DESCRIPTION OF THE PREFERRED EMBODIMENTS OF THE INVENTION

Figure 1:
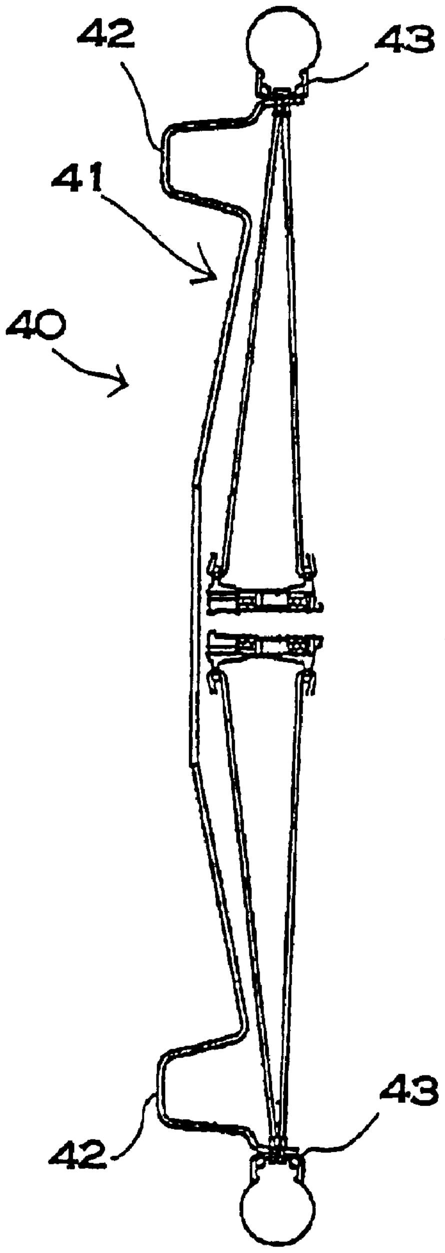
FIG. 1 is a sectional view of a wheel of a related art wheelchair.
Figure 2:
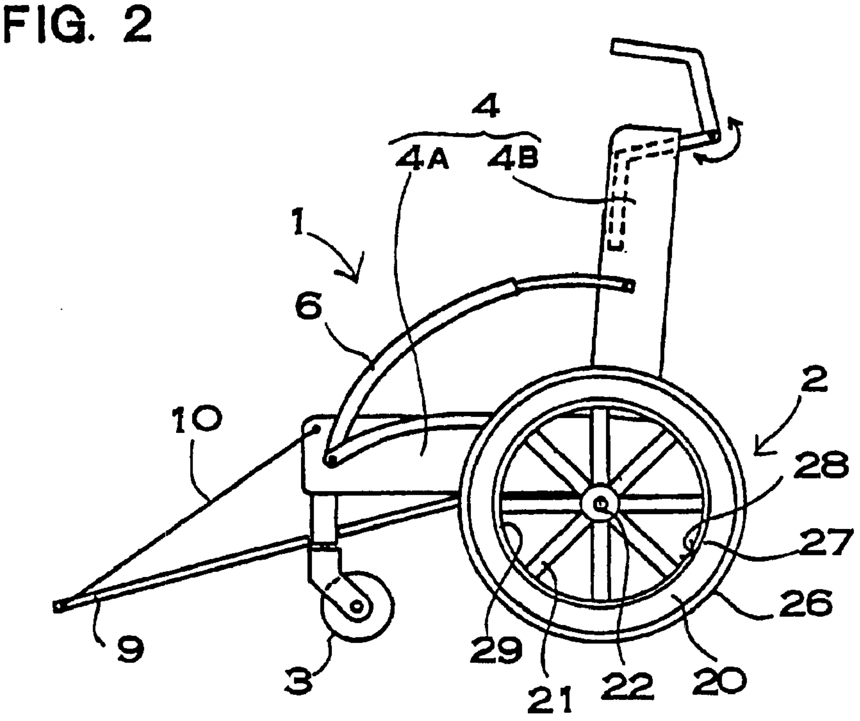
FIG. 2 is a side view of the wheelchair according to one embodiment of the invention.
Figure 3:
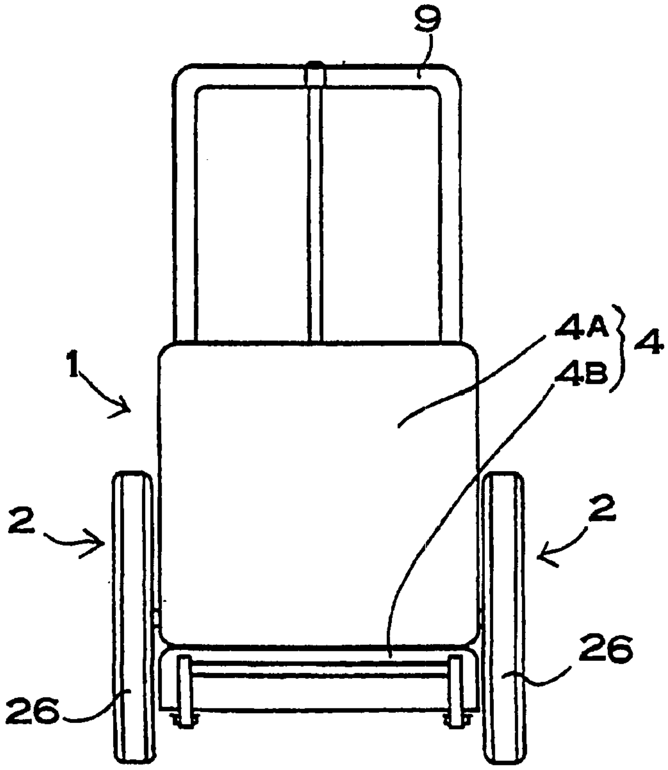
FIG. 3 is a plan view of the wheelchair shown in FIG. 2.
Figure 4:
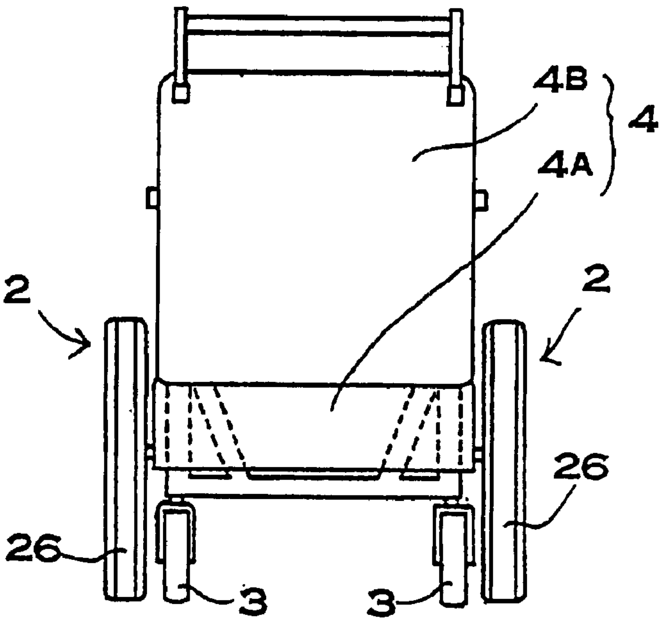
FIG. 4 is a rear view of the wheelchair shown in FIG. 2.
Figure 5:
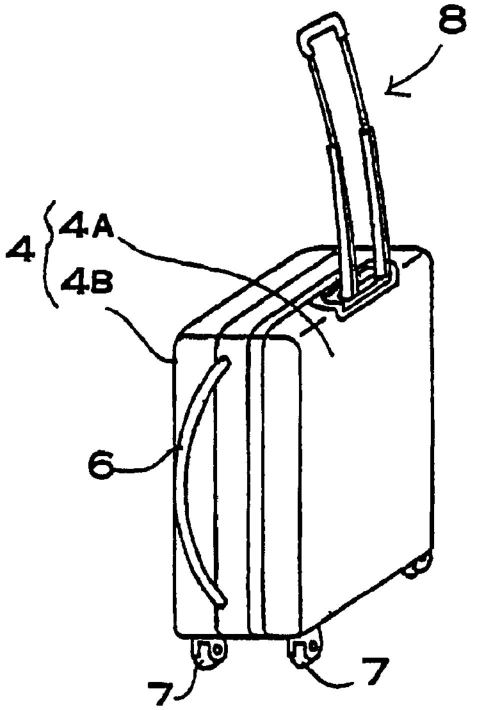
FIG. 5 is a perspective view which shows the wheelchair shown in FIG. 2 contained in a bag case.

A wheelchair shown in FIG. 2 to FIG. 4 comprises a chair part 1 on which a user can sit, wheels 2 rotatably attached to the both sides of the chair part 1, and free wheels 3 which are positioned in the front portion of the chair part 1 and are able to change the direction of travel of the wheelchair. The wheelchair, as illustrated in FIG. 5, is configured to be folded and housed in bag case 4 to easily carry the wheelchair. It should be noted that the present invention is directed to the whole mechanism of the wheelchair, thus the construction of the whole wheelchair is not limited to those shown in FIGS. The invention can employ any construction such as currently used or future developed structure, for example, a non-foldable wheelchair, or a wheelchair foldable in width only.

Figure 6:
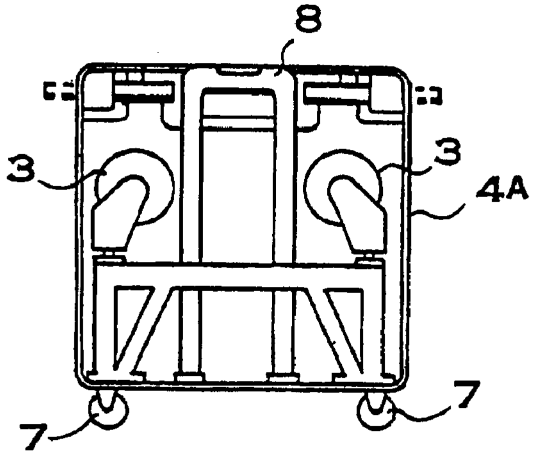
FIG. 6 is a sectional view of the bag case shown in FIG. 5

The wheelchair shown in FIGS. 2–4 employs the chair part 1 as the bag case 4. The bag case 4 comprises a first bag case part 4A serving as a seat base and a second bag case part 4B serving as a backrest. The first bag case part 4A and the second bag case part 4B provide the sidewalls around a rectangular bottom plate. The first bag case part 4A and the second bag case part 4B are connected to each other and mount necessary parts such as the wheels 2 and free wheel 3, respectively, as shown in FIG. 5 and FIG. 6. To store necessary parts, the first bag case part 4A and the second bag case part 4B are detachably connected by a detachable connector (not illustrated) at the opening edge of the peripheral walls. The detachable connector can be a mounting fitting used for connecting the bag detachably. When the device as a chair, the first bag case part 4A and the second bag case part 4B are opened to take out parts such as the wheels 2 and free wheels 3, and the first bag case part 4A and the second bag case part 4B are connected so as to have an angle slightly larger than a right angle to the bottom plate.

In order to achieve such a connection, the bottom plate provides a detachable connector 5.

Figure 7:
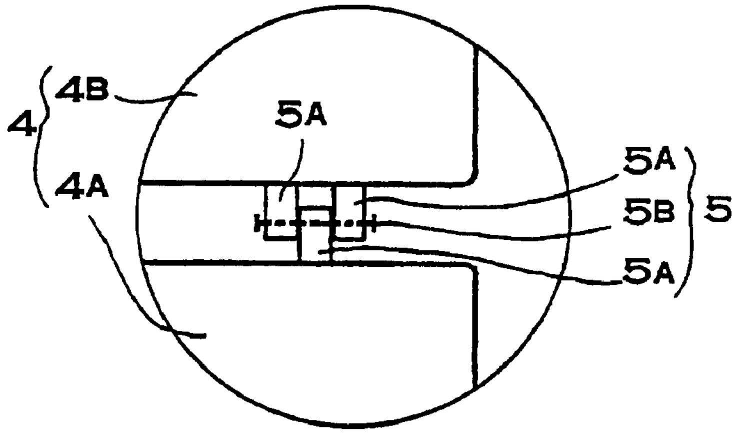
FIG. 7 is an enlarged view which shows a connecting construction of a first part of the bag case and a second part of the bag case.

This detachable connector 5 comprises an arm 5A fixed to the bottom plate, a connecting shaft 5B which penetrates and passes through the arm 5A as shown in the enlarged view of FIG. 7. The arm 5A forms a through-hole to permit the connecting shaft 5B to pass through. The first bag case part 4A and the second bag case part 4B are connected by the connecting shaft 5B passing through the through-hole. The first bag case part 4A and the second bag case part 4B connect an arch-shaped elbow rest 6 at both sides. The elbow rest 6 is expandable and it has a stopper (not illustrated) that can hold it at a desired length in expandable and/or contractable position. The elbow rest 6 is connected to the both ends of the first bag case part 4A and the second bag case part 4B to connect the first bag case part 4A and the second bag case part 4B with a predetermined angle.

Further, the bag case 4 shown in FIGS. 2–6 provides a movable wheel 7 on the first bag case part 4A and the second bag case part 4B to permit movement in a standing position retaining parts inside. The movable wheels 7 are free wheels that are movable in any direction of travel. Also, it has a telescopic motion handle 8 that can be retracted from the bag case 4 in a standing position.

The first bag case 4A connects the free wheel 3 in a foldable fashion. This free wheel 3 is housed in the first bag case part 4A as shown in FIG. 6. When the wheelchair is used, as shown in FIG. 2, the free wheel 3 is taken out from the first bag case part 4A, and it is stopped by a stopper (not illustrated) in a perpendicular position relative to the bottom plate of the first bag case part 4A. Further, the wheelchair shown in FIG. 2 provides a footrest 9 on the first bag case part 4A. The footrest can be extended and contracted so as to be extended to the position where a user can put his foot thereon when in use. The footrest 9 connects a string 10 on the edge portion and the string 10 is connected to the first case bag part 4A so as to maintain a predetermined angle.

Figure 8:
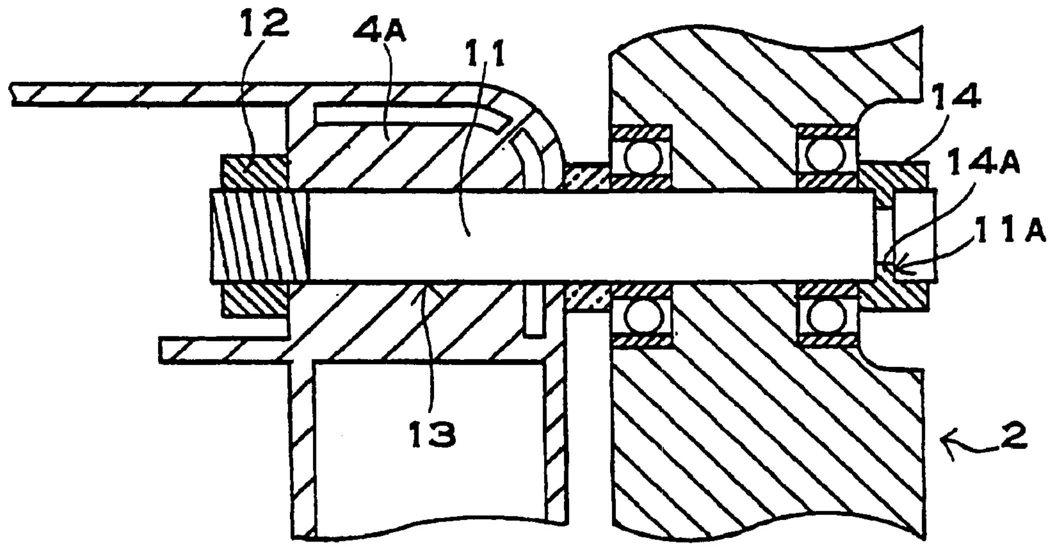
FIG. 8 is an expanded sectional view which shows a connecting construction of the wheel with the first bag case.

The wheel 2 is detachably mounted on both sides of the first bag case part 4A. The wheel 2 is detachably connected to an axle 11 of the first bag case part 4A. The first bag case part 4A detachably connects the axle 11 coupling the wheel 2 as shown in a sectional view of FIG. 8. The axle 11 provides male screw in a nose. A nut 12 connects the axle 11 by screwing the male screw, and it is fixed inside of the first bag case part 4A. Further, the first bag case part 4A forms a through-hole 13 on the sidewall for axle 11 to penetrate through. The axle 11 is secured to the first case bag 4A part by being screwed into the nut 12.

Figure 9:
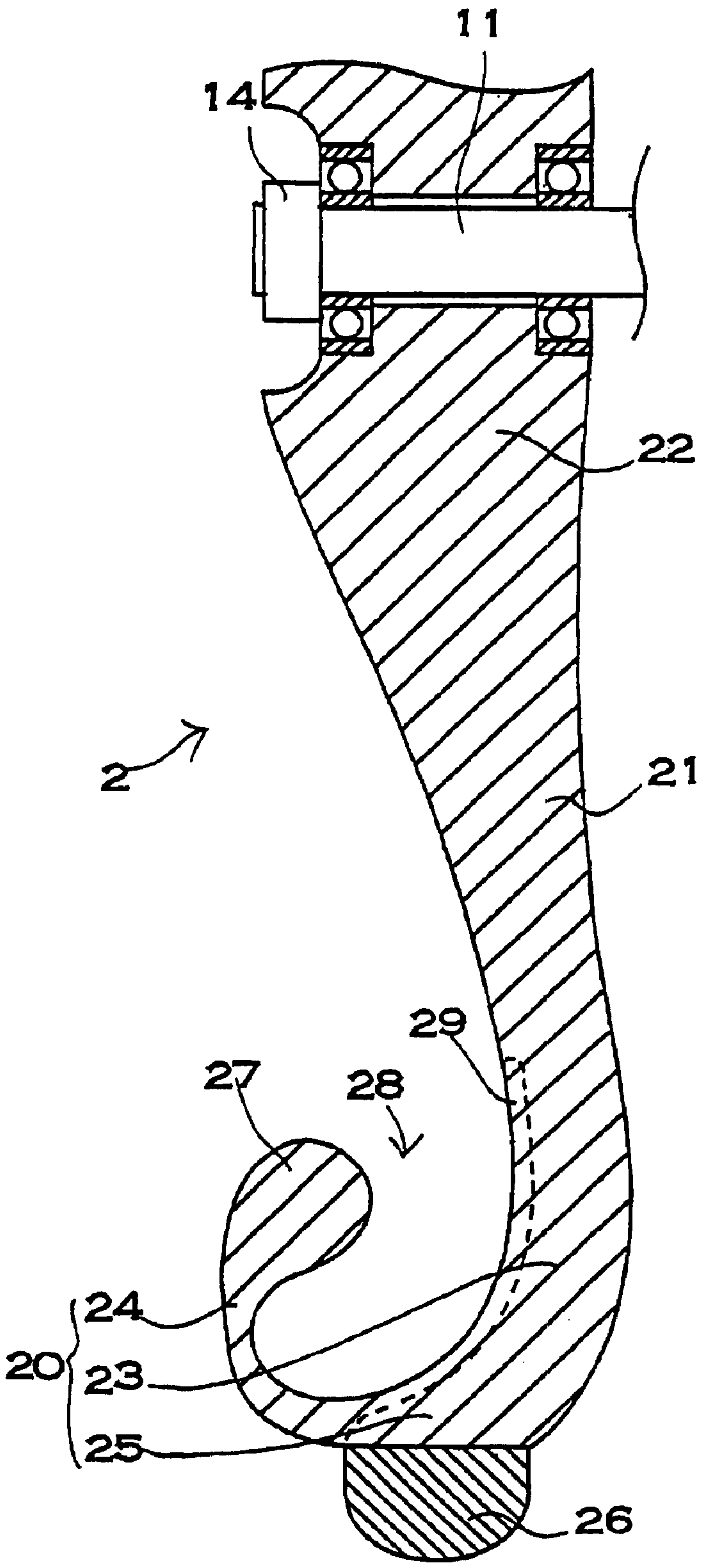
FIG. 9 is an expanded sectional view of the wheel of the wheelchair shown in FIG. 2.
Figure 10:
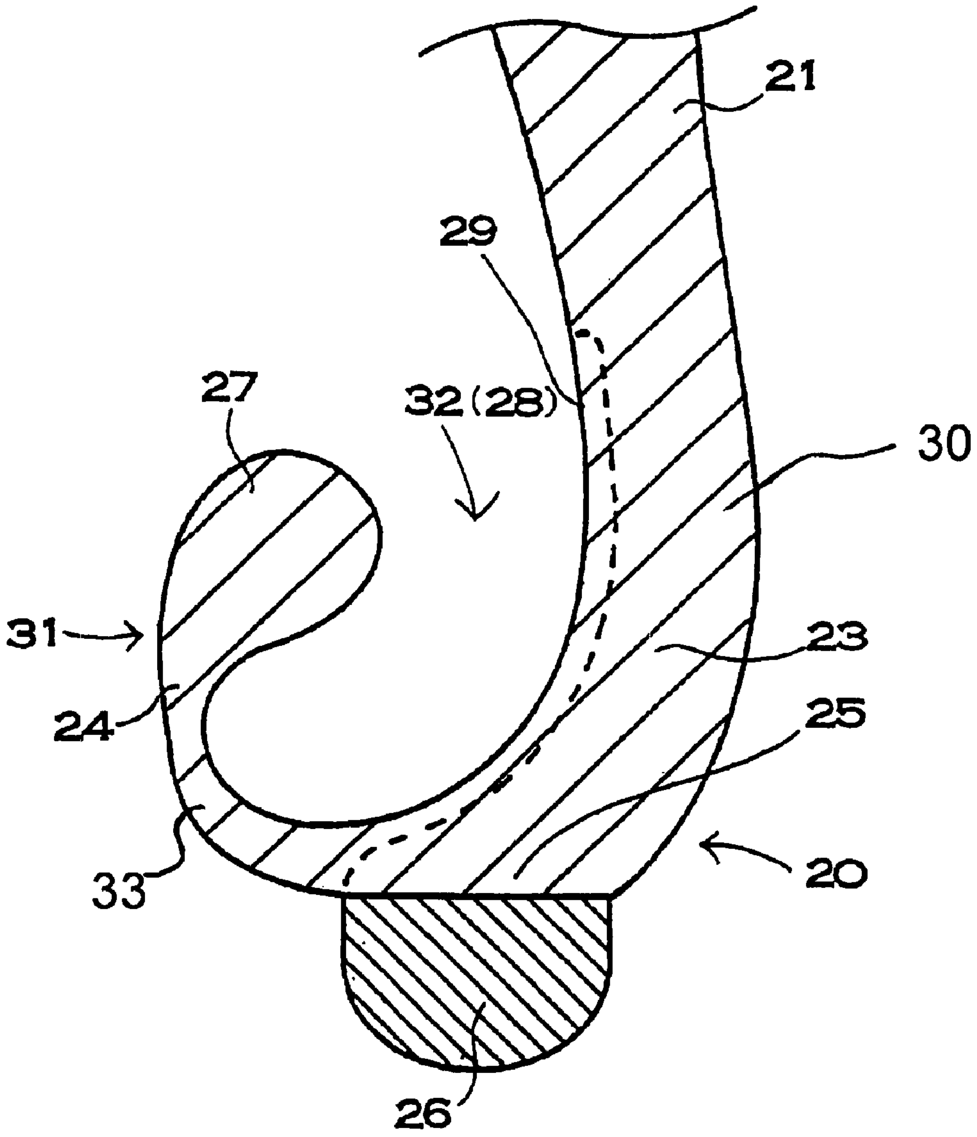
FIG. 10 is an expanded sectional view of the wheel rim member shown in FIG. 9.

As shown in FIG. 9, the wheel 2 comprises rim member 20 on an outer periphery, a hub member 22 which is rotatably connected to the axle 11 of chair part 1 which connects at the center of the rim member 20 via wheel part 21. As shown in FIG. 10, the wheel 2 comprises a continuous wall portion 31 at the outer periphery of the outer periphery portion. The rim member 20, shown in a cross-sectional view of FIG. 9 and FIG. 10, is shaped in U-shape form in cross section cut in the radial direction. This U-shape connects the inner sidewall 23 positioned in the chair side with the outer sidewall 24 on its opposing side via the connecting ring 25. The rim member 20 forms the continuous wall portion 31 by the outer sidewall 24. The rim member 20 fixes a cushion ring 26, which serves as a tire on the outer periphery in order to move smoothly even on a road with pits and/or projections. Although the cushion ring 26 is a rubber ring, it should be noted that a cushion ring can be a pneumatic tire. The cushion ring 26 is fixed on the outer periphery of the connecting ring 25 using adhesives. It should be noted that another configuration may also be applicable for connecting the cushion ring, like in the known wheel of a wheelchair, such as providing grooves on the outer periphery surface of the connecting ring and putting a cushion ring on there by applying adhesives along the grooves. The rim member 20 connects the inner sidewall 23 with the wheel part 21, and a grip ring 27 is provided on the edge of the outer sidewall 24. The rim member 20 forms a finger-holding cavity 32 by the outer sidewall 24, i.e., the finger-holding cavity 32 is formed by U-shaped part 28 composing the inner sidewall 23, connecting ring 25 and outer sidewall 24. By inserting the user's finger into the inside of the finger-holding cavity 32 thereby gripping the grip ring 27, the wheel 2 can be rotated and the wheelchair moved back and forth.

The surface area of the wheel 2 is clean, which means "substantially no obstacle such as pits, projections or gaps which may interfere or touch the user's hand," at the inner surface of the U-shaped part 28 composing the outer sidewall 24, connecting ring 25 and inner sidewall 23 along the radial direction. The wheel 2 achieves such the smooth surface without pits, projections nor gaps touching user's hand by integrally forming a smooth plate on the inner sidewall 23 which forms the inner surface of the U-shaped part 28. The wheel 2 with this configuration can be smoothly rotated by holding the grip ring 27. Further, the wheel 2 with this configuration does not employ a conventional structure such as a driving ring which drives the wheel and is fixed on the wheel by an arm, rather it employs a surface without pits, projections or gaps on the inner surface of the U-shaped part 28. Therefore, when rotating the wheel 2 by holding the grip ring 27, there is no obstacle which might interfere or touch the operator's hand, thereby effectively preventing the hand from being hurt. It should be noted that the wheelchair of the present invention may provide a minor irregularities such as pits or projections, even gaps on the inside of the U-shaped part. The rim member 20 comprising the inner side wall 23, outer sidewall 24 and flat plate 29 may be integrally formed in a plastic.

In the wheel 2 shown in FIGS. 9–10 the rim member 20, wheel part 21 and hub member 22 are molded in one piece and are formed of plastic. The wheel part 21 is a radial rod connecting the edge portion of the hub member 22 and rim member 20. The wheel part 21 may be formed in a planar shape as a whole. Further, the wheel can employ another form such as the rim member comprising the inner side wall, outer sidewall, connecting ring and smooth plate is integrally formed of plastic, and it is connected to the hub member via a wheel part, which is a separate member from the rim member.

Figure 11:
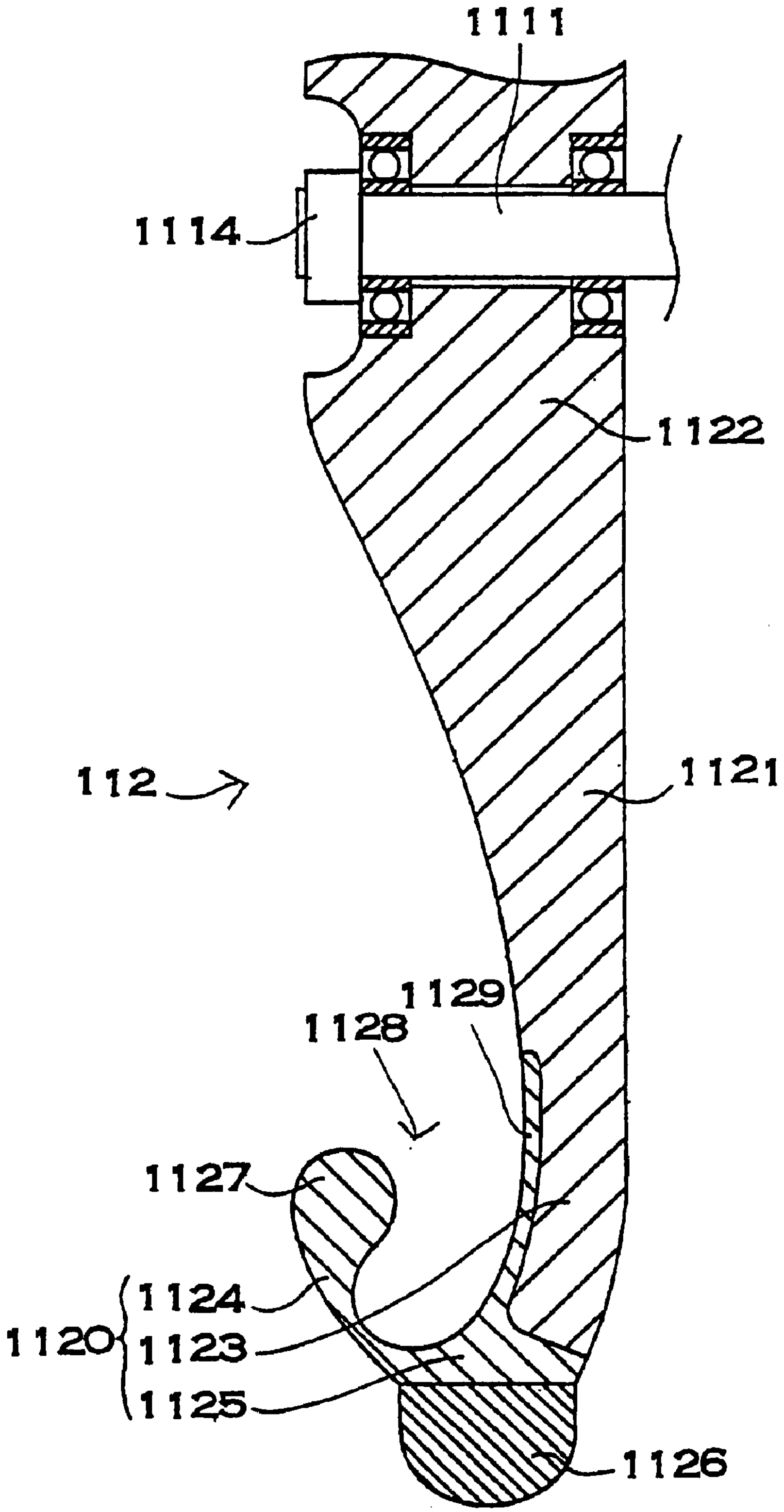
FIG. 11 is an expanded sectional view of another example of a wheel.
Figure 12:
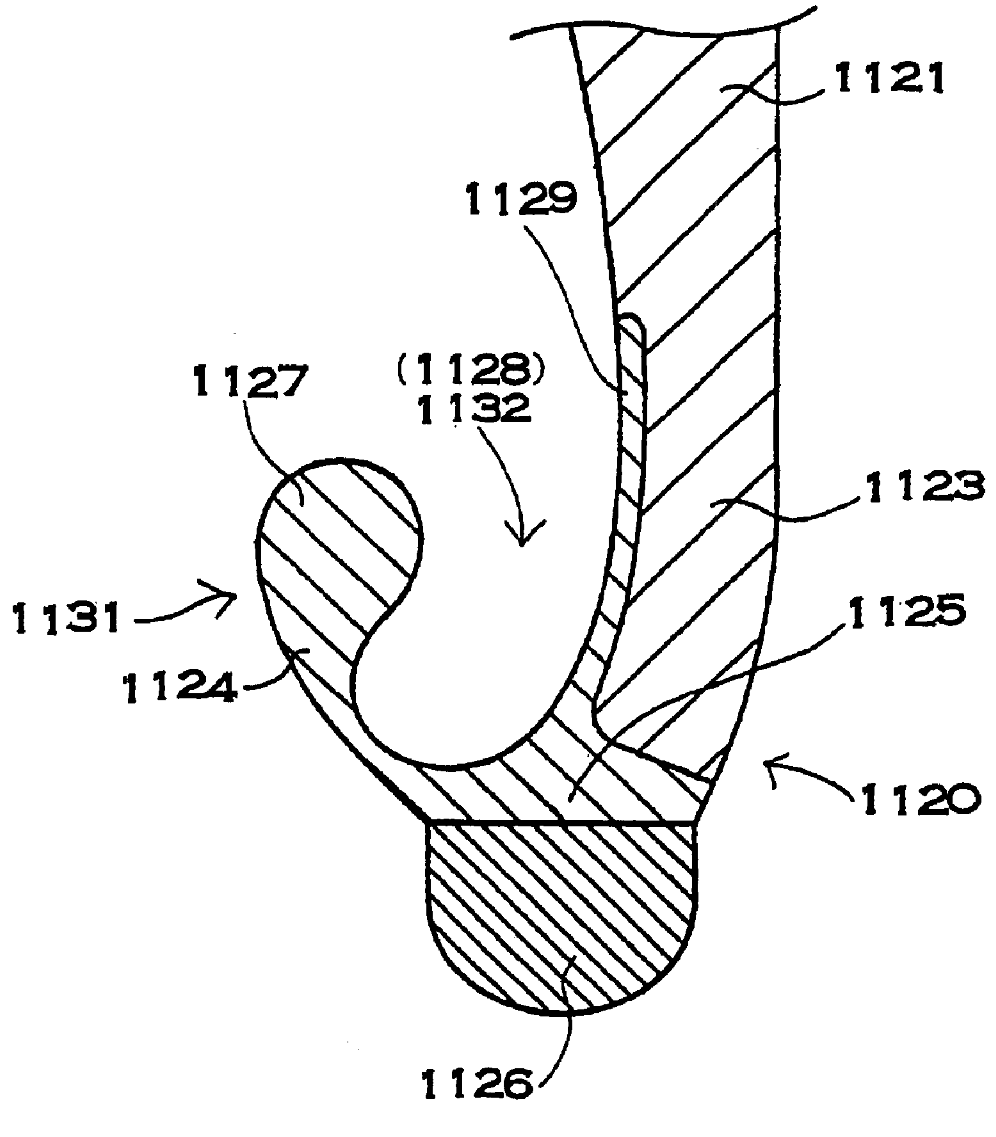
FIG. 12 is an expanded sectional view of the wheel rim member shown in FIG. 11.

The wheel 2 employs an inwardly curved edge portion of the grip ring 27 of the outer sidewall 24 of the rim member 20, and the grip ring 27 is provided on the open end of the U-shaped part 28. In the rim member 20 with this construction, the wheel 2 can be rotated by deeply inserting operator's finger into an aperture to firmly grip the finger-holding cavity 27. It should be noted that the rim member of the wheel can also employ the grip ring 1127 in a position extending in a vertical direction as shown in FIG. 11 and FIG. 12. In these Figures the same components as explained above are assigned the same number as the last two digits of the above described example.

Furthermore, the wheelchair of the present invention can employ the following wheel construction. Here, the same rule is applied as above, i.e., in the following examples, the same components as in above-mentioned example are labeled with the same legend and the same two digits of the reference number are assigned as the above-mentioned example, and detailed explanation thereof is omitted.

Figure 13:
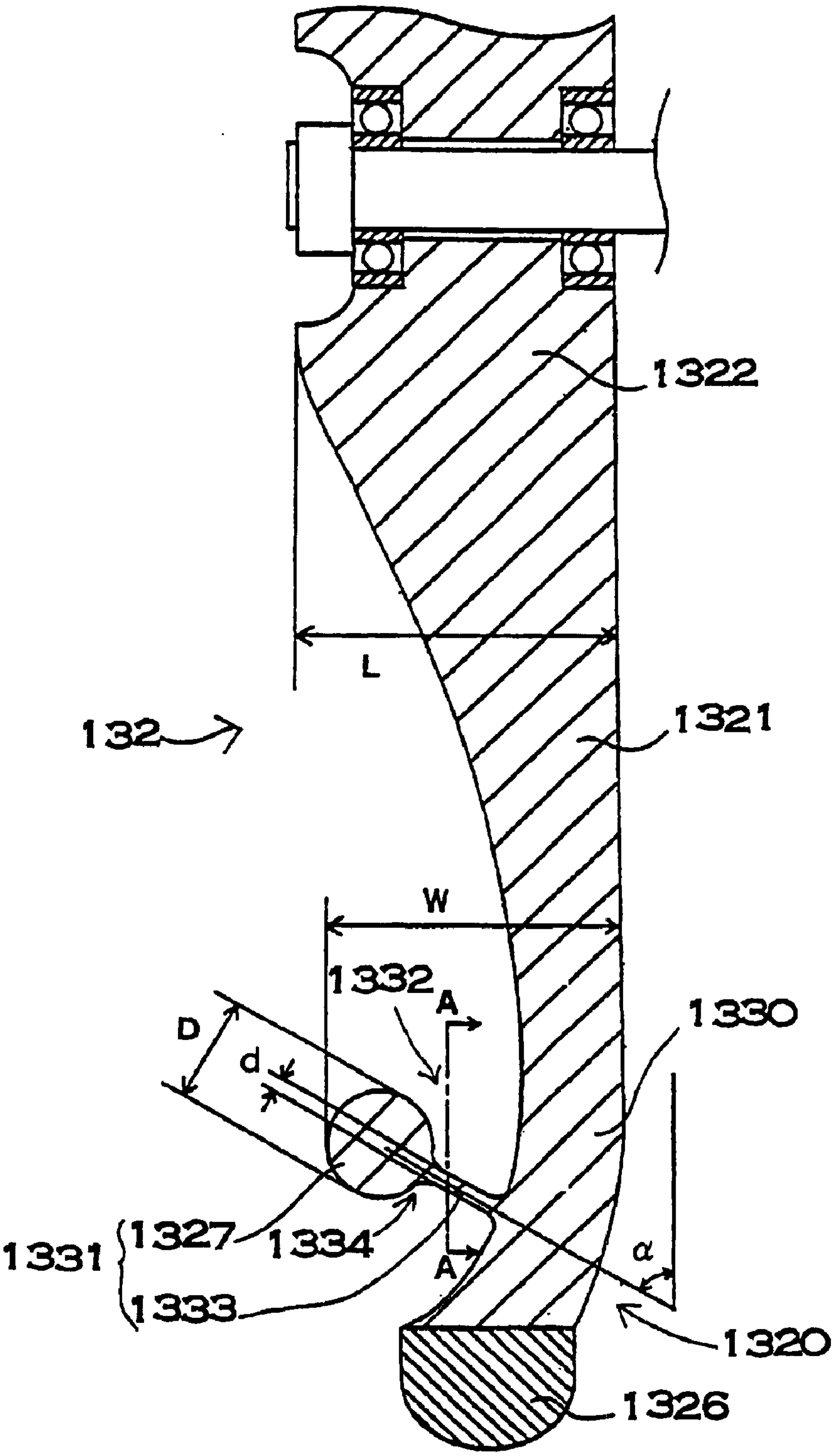
FIG. 13 is an expanded sectional view of another example of a wheel.
Figure 14:
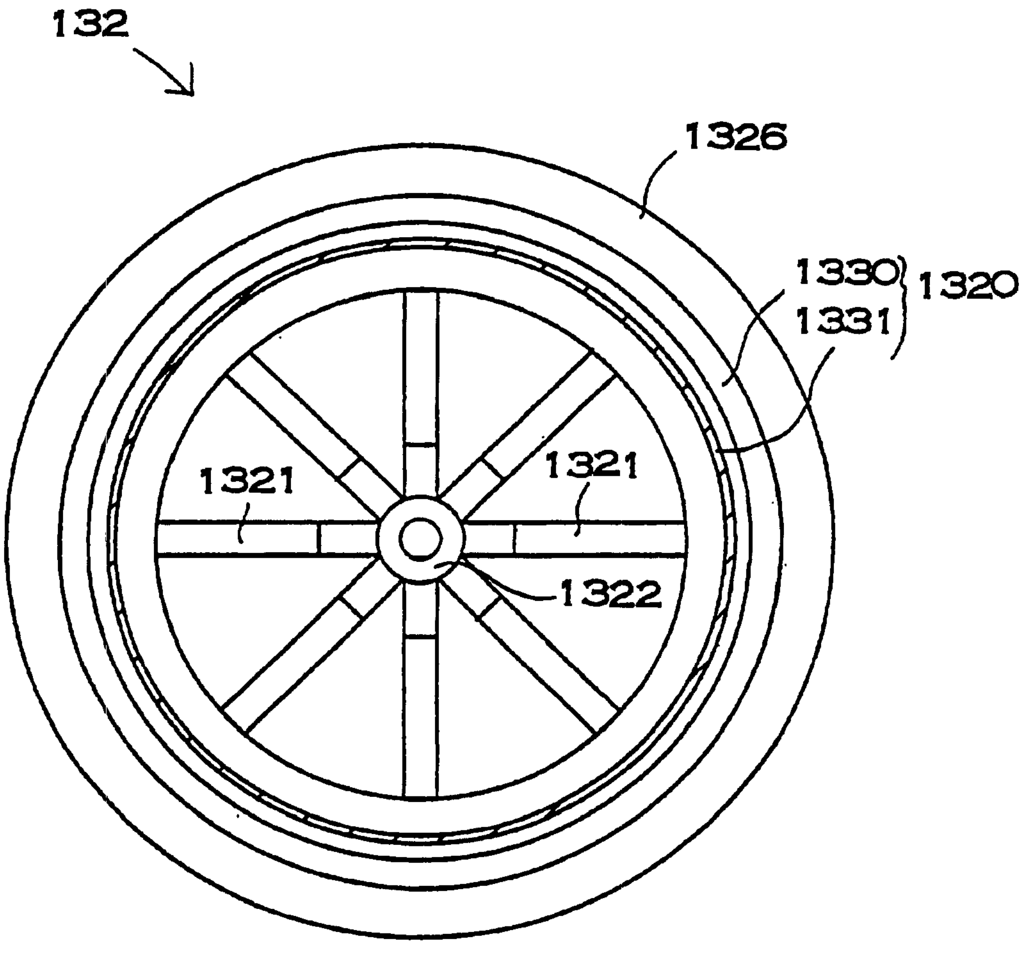
FIG. 14 is a sectional view taken along line A—A, of the wheel shown in FIG. 13.

The rim member 1320 of the wheel 132 shown in FIG. 13 comprises a ring member 1330 connected with the wheel part 1321 and a continuous wall portion 1331 arranged on the outside face of the ring member 1330. In rim member 1320, the cushion ring 1326 is fixed to the outer periphery of the ring member 1330, and the grip ring 1327 is provided on the edge of the continuous wall portion 1331. As shown in the sectional view of FIG. 14, the continuous wall portion 1331 is in ring form consecutive in the rotating direction of the wheel 132, and this ring shape is along the outer periphery of the ring 1330. As shown in FIG. 13, the continuous wall portion 1331 protrudes outwardly from the outside surface of the ring member 1330, and the grip ring 1327 provided on the edge portion is arranged in distant location away from the ring member 1330. The continuous wall portion 1331 protruding from the ring member 1330 is designed so that the width (W) of this part is smaller than the width (L) of the hub member 1322 of the wheel 132, or alternatively is substantially equal. It should be noted that the width in a continuous wall portion (W) may be larger than the width (L) of a hub member of a wheel to some extent.

As shown in FIG. 13, the rim member 1320 with the continuous wall portion 1331 and ring member 1330 form the finger-holding cavity. The finger-holding cavity is the positioned between the ring member 1330 and grip ring 1327, and is open to the inner side of the rim member 1320. In this wheel, an operator can insert his finger into the inside of the finger-holding cavity to grip the grip ring 1327 with his hand. Further, the rim member 1320 employs the surface area where the surface of the continuous wall portion 1331 and the outer surface of the ring part 1330 has no pits, projections or gaps which may bar or contact the operator's hand along the rotating direction of the wheel 132. It should be noted, as for the continuous wall portion and the ring member, minor pits and projections which do not hurt the operator's hand even if they touched, or other gaps may be provided on their surfaces.

Further, the continuous wall portion 1331 has a maximum thickness (D) of the grip ring 1327 which is larger than the minimum thickness (d) of the connecting portion 1333 of the grip ring 1327 with the ring member 1330. It should be noted, in this specification, the maximum thickness (D) of the grip ring and the minimum thickness (d) of a connecting portion mean the thickness in a perpendicular direction relative to the projecting direction of the continuous wall portion 1331 as shown in FIG. 13. Therefore, "making the maximum thickness of a grip ring (D) larger than the minimum thickness (d) of a connecting portion" means that a portion is at least thinner than the grip ring in an intermediate portion of the connecting portion. By employing the rim member 1320 with this configuration, it allows firm gripping applying light force on the grip ring 1327 by gripping thinner portion of the connecting portion 1333 while inserting fingers into the finger-holding cavity 1332. The continuous wall portion 1331 has a maximum thickness of a grip ring (D) more than one time, preferably 1.2–10 times, more preferably 2–5 times larger than the minimum thickness (d) of a connecting portion 1333 to easily grip the grip ring. Further, the continuous wall portion 1331 shown in FIG. 13 forms a grip cavity 1334 on the opposing side of the finger-holding cavity 1332, i.e., at the interface of outer peripheral side of the rim member 1320 and the grip ring 1327 and connecting portion 1333. This continuous wall portion 1331 allows easy gripping of the grip ring 1327 by catching hold both of the finger-holding cavity 1332 and grip cavity 1334. The continuous wall portion 1331 shown in FIG. 13 employs a circular shape of the cross-section of the grip ring 1327. It should be noted that the grip ring may also employ various shapes which would not hurt the operator's hand even upon contact, such as oval, ellipse, or other configurations having a curved portion.

Further, the rim member 1320 shown in FIG. 13 employs a planar connecting portion 1333, and makes the continuous wall portion 1331 slant toward the center direction of the wheel 132. This construction has the advantageous effect of making the finger-holding cavity 1332 deeper so that finger insertion into this area becomes easier. The continuous wall portion 1331 makes the finger-holding cavity 1332 deeper ideally by making the angle of dip a for the radial direction of the wheel 132 an acute angle. The angle of dip a of the continuous wall portion 1331 can be 30–80 degrees, for example, preferably 45–70 degrees. It should be noted that the angle of dip a of continuous wall portion is not necessarily an acute angle, and it may be more than 90 degrees. For example, the rim member 1520 of the wheel 152 shown in FIG. 15 employs about 90 degrees of angle of dip a for the continuous wall portion 1531. The continuous wall region 1531 has a maximum thickness (D) of the grip ring 1527 that is more than 3 times larger than the thickness of connecting portion 1533, and the grip cavity 1532 is formed by projecting the edge portion of the grip ring 1527 into the center direction of the wheel 152. Although not illustrated, the continuous wall portion can make the finger-holding cavity much deeper by enlarging the maximum thickness (D) of the grip ring. By the way, the continuous wall portion 1531 of FIG. 15 also provides the grip cavity 1534 on the opposing side of the finger-holding cavity 1532 so that the grip ring 1527 can be easily and comfortably gripped.

Figure 15:
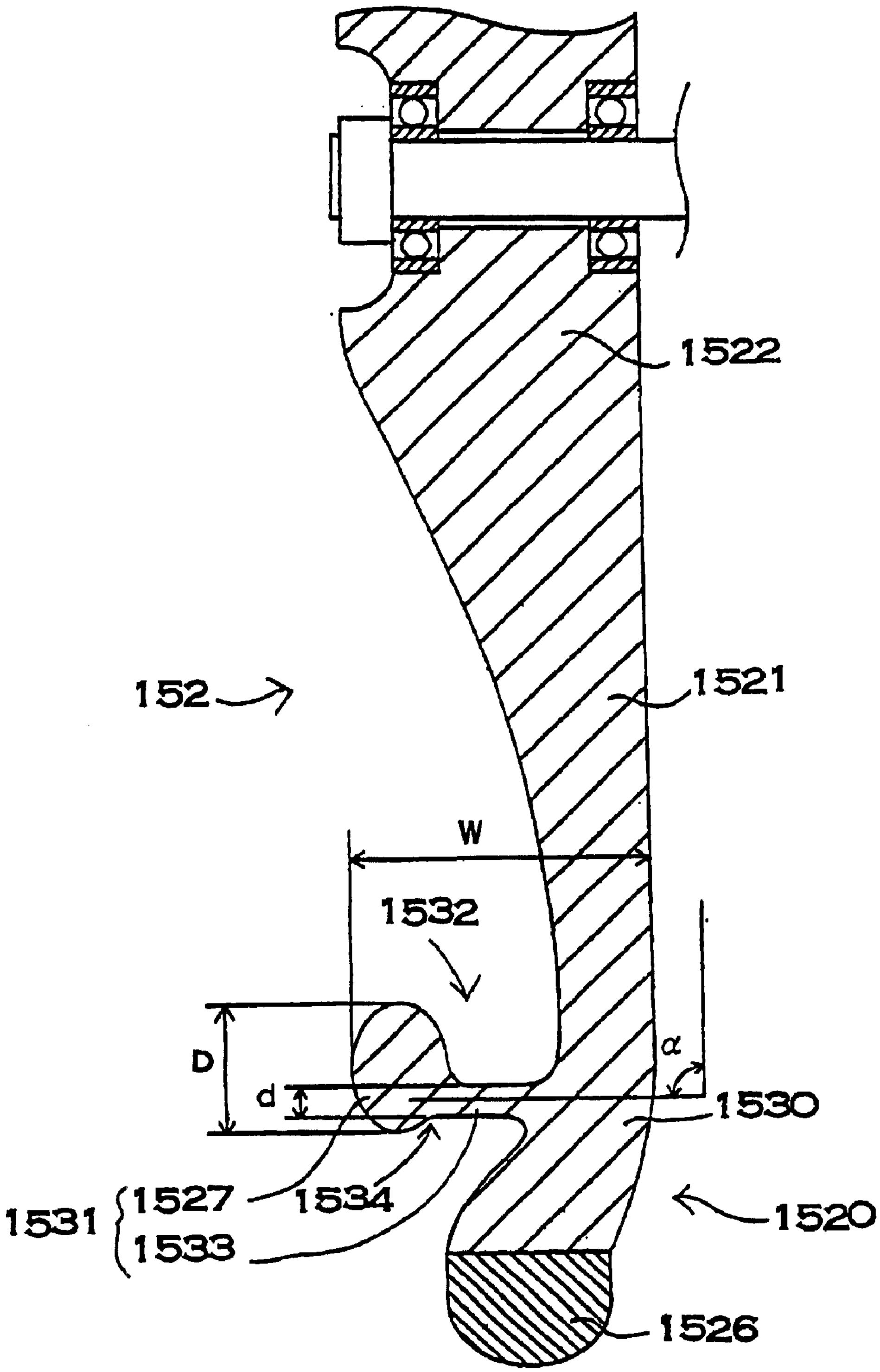
FIG. 15 is an expanded sectional view of another example of a wheel.

Further, the rim member 1320 shown in FIG. 13 and the rim member 1520 shown in FIG. 15, 1520 are the outer periphery of the ring member 1330 and 1530, and the continuous wall portion 1331 and 1531 are provided in spaced-apart position to the center side to some extent from the outer peripheral edge. Because the rim member 1320 and 1520 are formed in a curved shape at the cross-section of the their outer side toward the chair part 1, the finger-holding cavity 1322 and 1532 are made deeper without enlarging the width (W) of the wheels 132 and 152, by means of providing the continuous wall portions 1331, 1531 in spaced-apart position to the center side to some extent from the outer periphery. It should be noted that the continuous wall portion may be provided in the outer peripheral edge of the ring member. The configuration of providing the continuous wall portion angled toward the inner periphery achieves deeper a finger-holding cavity by elongating the continuous wall portion and providing the grip ring on the edge, without enlarging the width of the wheel.

Figure 16:
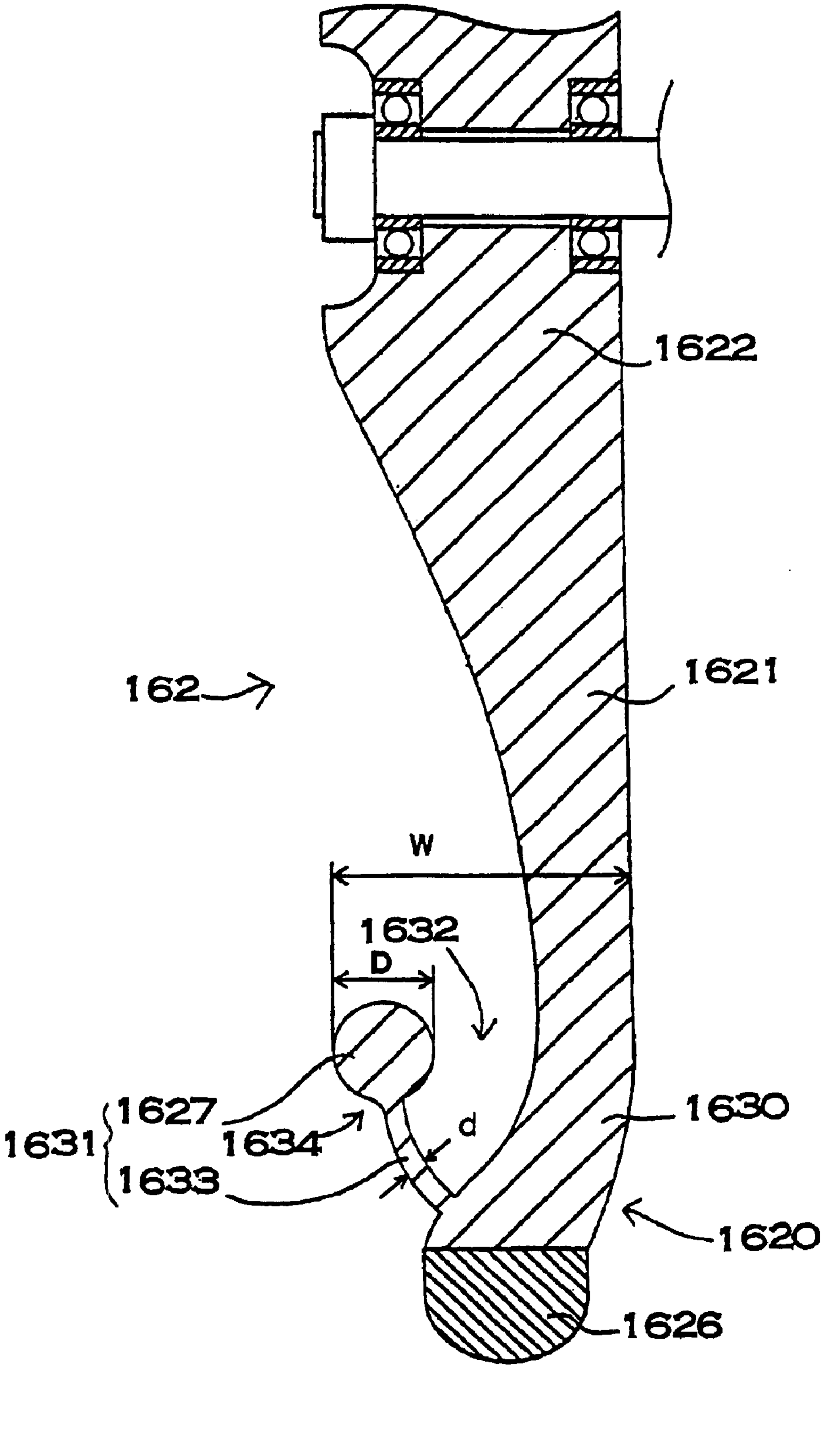
FIG. 16 is an expanded sectional view of another example of a wheel.

Further, the rim member 1620 of the wheel 162 shown in FIG. 16 curves the continuous wall portion 1631 toward the center direction of the wheel 162. The continuous wall portion 1631 shown in FIG. 16 curves the connecting portion 1633 toward the wheel 162 and provides the grip ring 1627 on the edge portion. The rim member 1620 with this construction deepens the grip cavity 1632 by curving the continuous wall portion 1631. As described above, such a curved configuration of the continuous wall portion 1631 allows deeper a finger-holding cavity 1632 by elongating the continuous wall portion 1631 without largely protruding the grip ring 1627 outwardly, i.e., without enlarging the width (W) of the wheel 162. This construction can achieve firm and comfortable gripping of grip ring 1627.

Further, the wheel 2 shown in FIG. 9 to FIG. 12 has wheel part 21 curving from inside close to the chair part 1 to the outside, from the rim member 20 to the hub member 22, i.e., from the outer region to the center. This wheel 2 has an advantageous effect of narrowing the whole wheel width while making a shape that makes it easy to grasp the grip ring 27. Accordingly, the wheelchair, in which the width of wheel 2 is narrow, can also shrink the whole wheelchair width, thus it achieves extremely functional movement even in a small location such as a vehicle or a lavatory.

Figure 17:
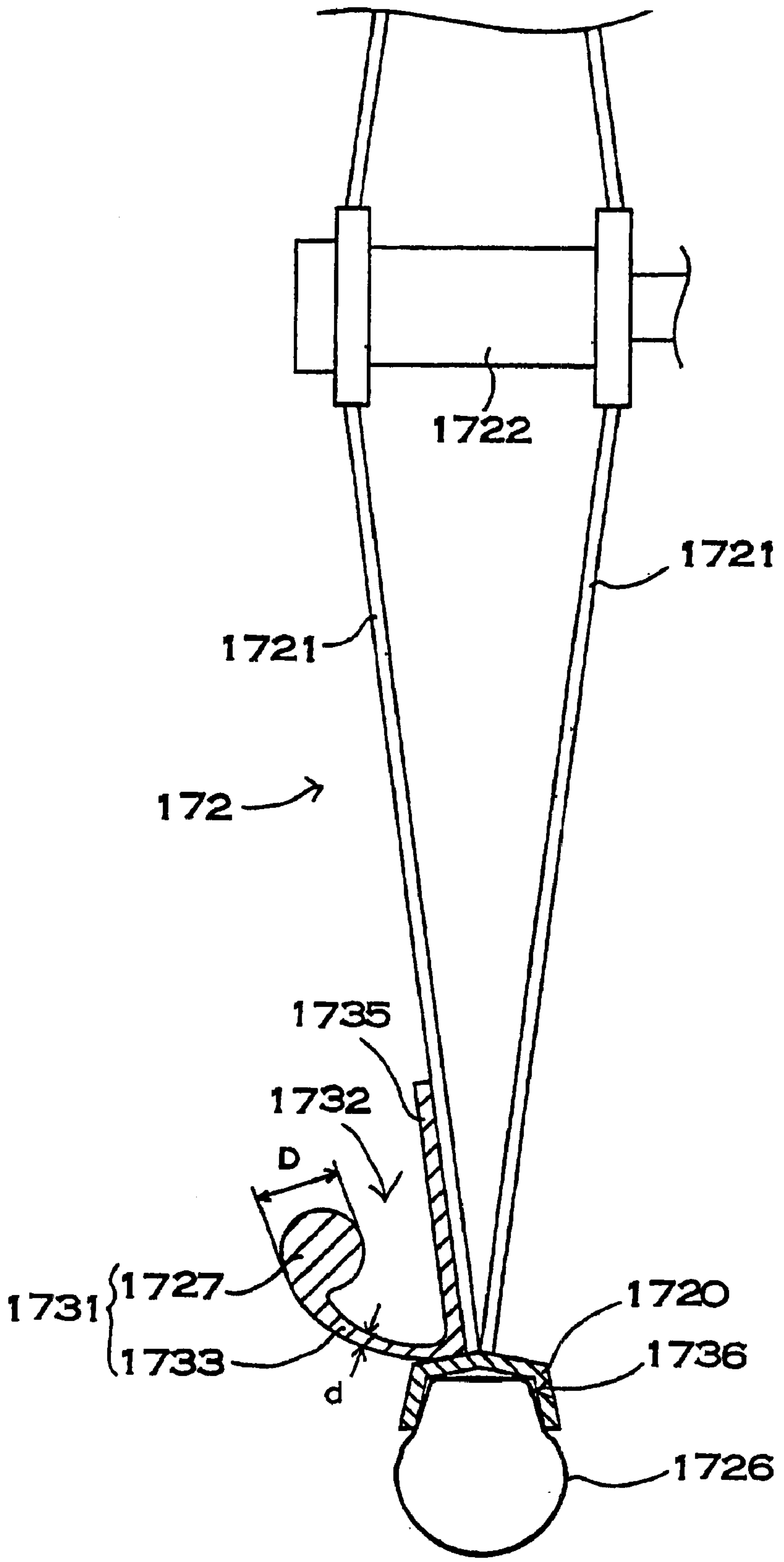
FIG. 17 is an expanded sectional view of another example of a wheel.
Figure 18:
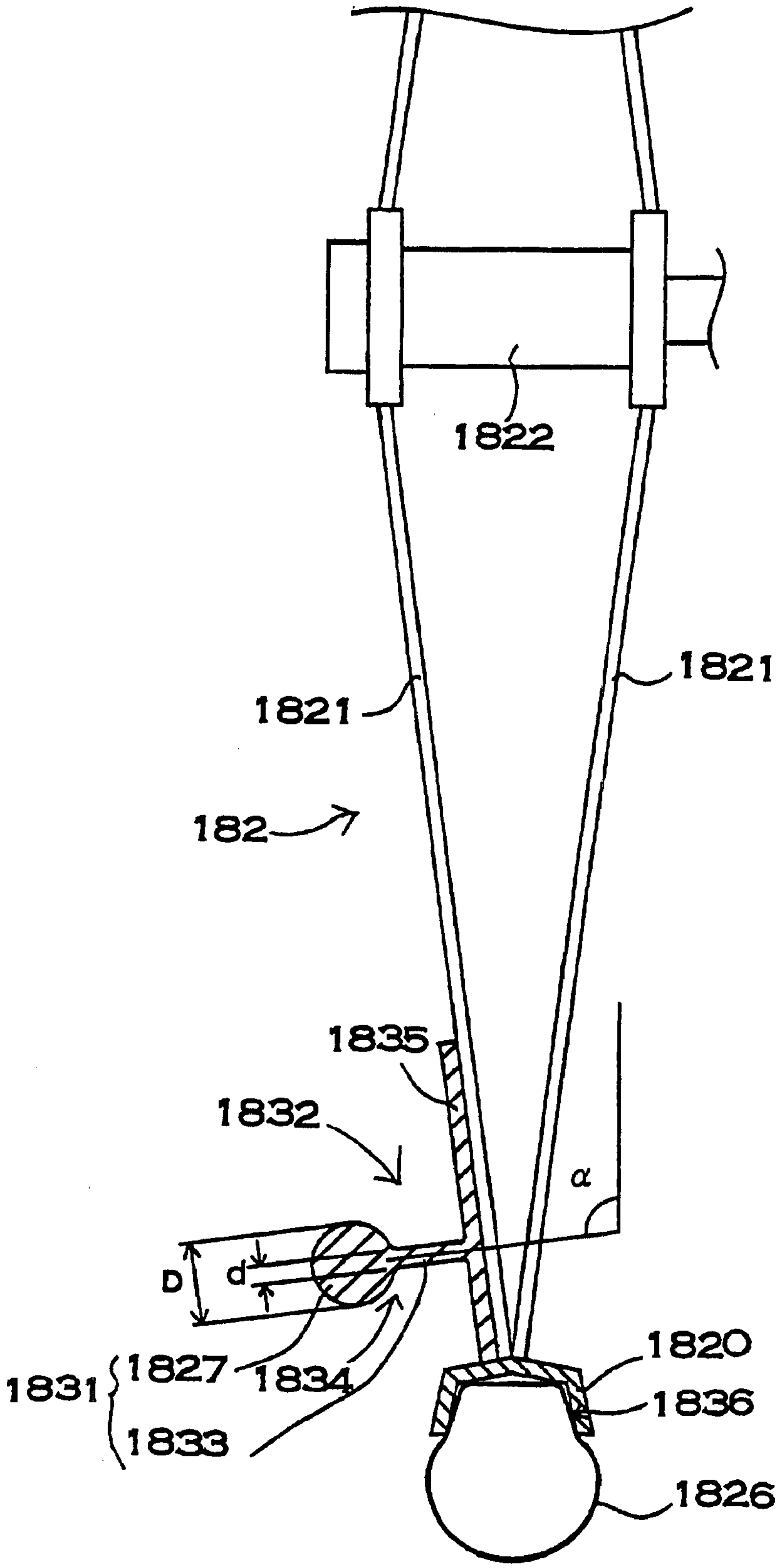
FIG. 18 is an expanded sectional view of another example of a wheel.

Further, the wheel can employ the construction shown in FIG. 17 and FIG. 18. The wheel 172 shown in these Figures uses wheel parts 172, 182 having radial rods, and connects the hub members 1722, 1822 with the rim members 1720, 1820 via these plural rods. The radial rods composing the wheel part 1721, 1821 are disposed alternately on the outside and inside (left and right in FIGS.) of the wheel 172, 182 at even spacing, which is the same structure as a wheel of bicycle. The wheels with this configuration are fabricated using the hub members 1722, 1822, the wheel parts 1721, 1821 and the rim members 1720, 1820, and all of the parts are made of metal, or partially made of metal parts and others made of plastic. Further, the wheel 172, 182 forms grooves 1736, 1836 on the outer periphery of the rim members 1720, 1820 and puts cushion rings 1726, 1826 on the grooves 1736, 1836. This cushion ring 1726, 1826 can be a tire of a tube type.

Further, the wheels 172, 182 provide the continuous wall portions 1731, 1831 on the outside of the outer peripheries, and these continuous wall portions 1731, 1831 form the finger-holding cavities 1732, 1832. The wheel 172 shown in FIG. 17 provides the continuous wall portion 1731 at the interface between the wheel part 1721 and rim member 1720. The wheel 182 shown in FIG. 18 provides the continuous wall portion 1831 on the outer periphery of the wheel part 1821. Also, a continuous wall portion may be provided in the outside surface of a rim member. The continuous wall portions 1731, 1831 are connected with the outside faces of the wheels 172, 182, and are fixed thereon. In order to connect and fix these wheels 172, 182, the wheels 172, 182 fix ring-shaped fixing plates 1735, 1835 on the outer peripheries of the wheel parts 1721, 1821. The continuous wall portions 1731, 1831 are integrally formed with the fixing plates 1735, 1835, and are fixed on the outer peripheries of the wheels 172, 182 via the fixing plates 1735, 1835. It should be noted that the continuous wall portions can be fixed by connection with the fixing plate and, not integrally formed with the fixing plates. The fixing plates 1735, 1835 are connected and fixed with wheel part 1721, 1821 or rim members 1720, 1820 by welding or adhesion. It should be noted that the fixing plates can be connected or fixed by using a connector.

The continuous wall portions 1731, 1831 protrude from the fixing plates 1735, 1835 outwardly, and the grip rings 1727, 1827 are provided on their edge portions. The continuous wall portions 1731, 1831 arrange the grip ring 1727, 1827 on their end portions apart from the outer side of the wheels 172, 182, and form the finger-holding cavities 1732, 1832 opening at inner peripheral side. Further, the wheels 172, and 182 also make their surface area of the continuous wall portions 1731, 1831 and fixing plates 1735, 1835 faces as non-obstacles such as dips, projections or gaps, those of which might bar movement of an operator's hand toward the rotation direction of the wheel 172, 182, as with the above-mentioned wheels. It should be noted that, as for the continuous wall portion and the fixing plate, there might be minor objects or portions such as dips, projections or gaps to the extent that these objects would not hit or hurt the operator's hand even if the event of contact.

The continuous wall portion 1731 shown in FIG. 17 has an end portion that curves toward the center of the wheel 172, similar to the continuous wall portion 1631 shown in FIG. 16, thereby making the finger-holding cavity 1732 deeper by such curving continuous wall portion 1731. In addition, the continuous wall portion 1831 shown in FIG. 18 an forms angle of dip a as with respect to the radial direction of the wheel 182 as an obtuse angle. Further, these continuous walls portions 1731, 1831 also define the relationship of the maximum thickness (D) of the grip rings 1727, 1827 and minimum thickness (d) of the connecting portions 1735, 1835, such that the grip rings 1727, 1827 are easy to be gripped.

The above-mentioned wheelchair is used as follows:

(1) The first bag case part 4A and the second bag case part 4B are opened, and the wheel 2 is taken out from the bag case 4.

(2) The elbow rest 6 is adjusted to the desired length, and the first bag case part 4A and the second bag case part 4B are connected at a substantially right angle.

(3) The axle 11 is fixed to the first bag case part 4A, and the wheel 2 is mounted on this axle 11. After the axle 11 is inserted into the wheel 2, the stopper 14 is mounted on the nose of the axle 11 to prevent removal. The stopper 14 has the locking part 14A for elastically locking on the grip cavity 11A of the nose of the axle 11.

(4) The free wheel 3 retained in the first bag case part 4A is raised from the first bag case part 4A and stopped. The footrest 9 is extracted and fixed.

In the above condition, the user or operator sits on the chair part 1, and rotates the wheel 2 to move back and forth. In the case of folding the wheelchair, for example when taking a vehicle, the wheel 2 is detached, and retained in the bag case 4, the free wheel 3 is folded, and the footrest 9 is stored in the first bag case part 4A. In this state, the first bag case part 4A is connected with the second bag case part 4B. This can move by moving caster 7 of the bag case 4. Also, a telescopic motion handle 8 is extendable for movement by pushing or pulling.

Figure 19:
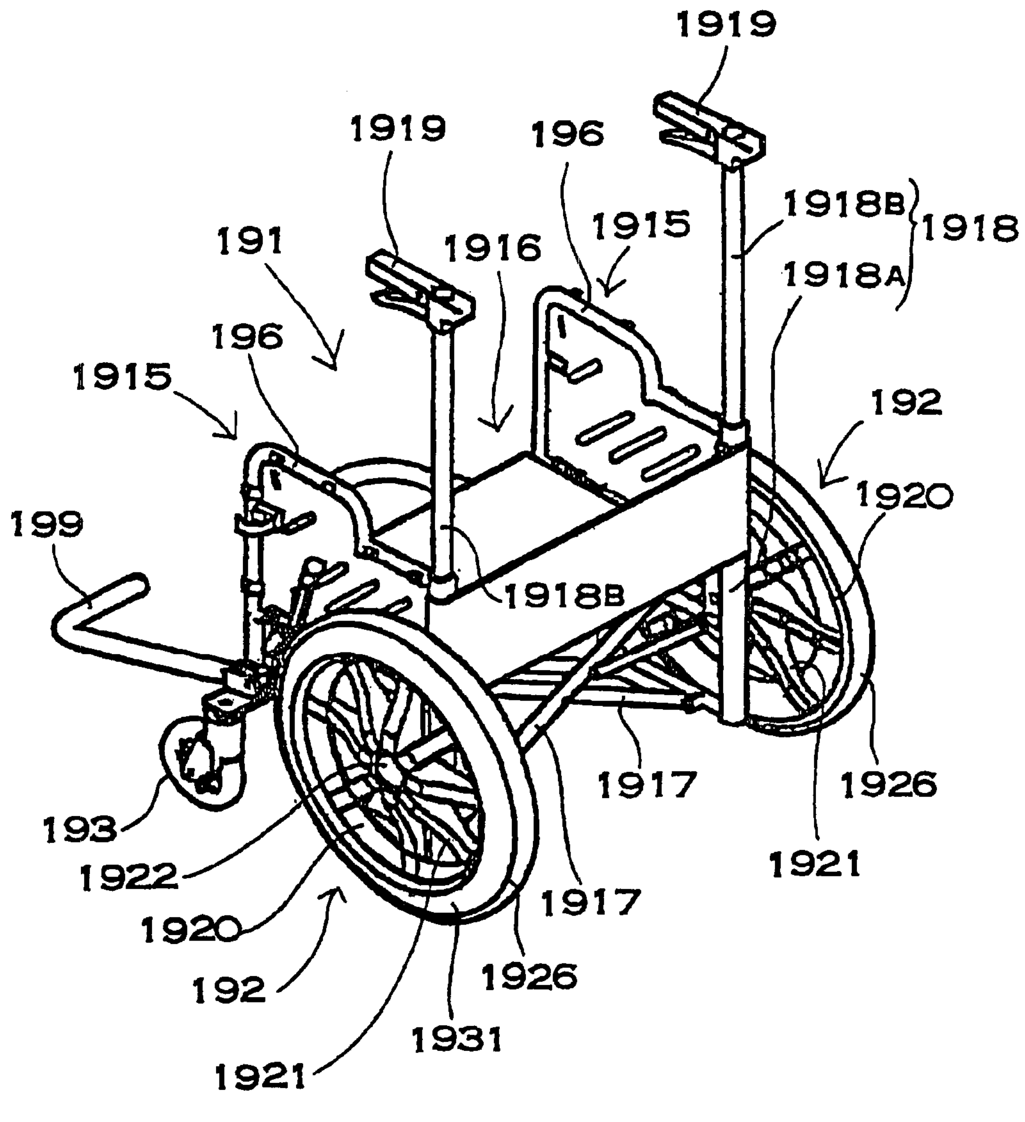
FIG. 19 is a rear perspective view of the wheelchair according to another example of the present invention.
Figure 20:
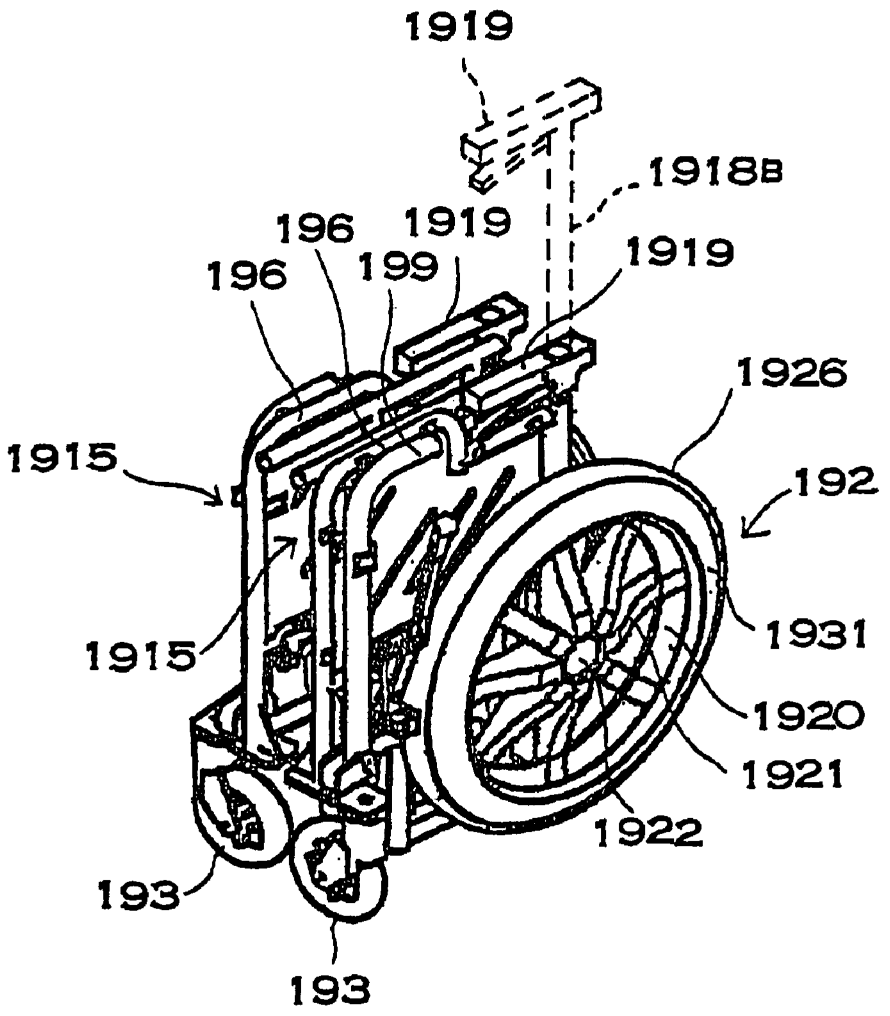
FIG. 20 is a front perspective view showing the folded wheelchair shown in FIG. 19.

The above-mentioned wheelchair according to the examples have foldable and movable structures such that the wheelchair is foldable so as to be housed in the bag case 4, and can be carried easily. It should be noted that the present invention is directed to the unique wheel structure, and not the whole structure of the wheelchair. Therefore, construction of the whole wheelchair is not limited to the above-mentioned construction. For example, a wheelchair of the present invention can employ a construction such as that shown in FIG. 19. The wheelchair shown in FIG. 19 comprises a chair part 191 having elbow rests 196 on both sides, a pair of wheels 192 rotatably attached on both sides of the rear area of the chair part 191, and a pair of free wheels 193 rotatably attached on both sides of the front area of the chair part 191 for changing the direction of travel freely. As shown in FIG. 19 to FIG. 20, the chair part 191 is foldable so as to make its width smaller or narrower by bring both elbow rests 196 near each other. This chair part 191 comprises side frames 1915 located on both sides, sitting base 1916 for sitting thereon, and folding links 1917 connecting the side frame 1915 and sitting base 1916. As shown in FIG. 19, the chair part 191 with this structure can establish a state in which a user can sit on the sitting base 1916 by opening wide the side frames 1915 relative to each other. Also, the folding state shown in FIG. 20 is established by closing the side frames 1915, i.e., moving the elbow rests 196 provided on the side frames 1915 together. In this folded state, the wheelchair is usable as a stick for supporting a user.

Figure 21:
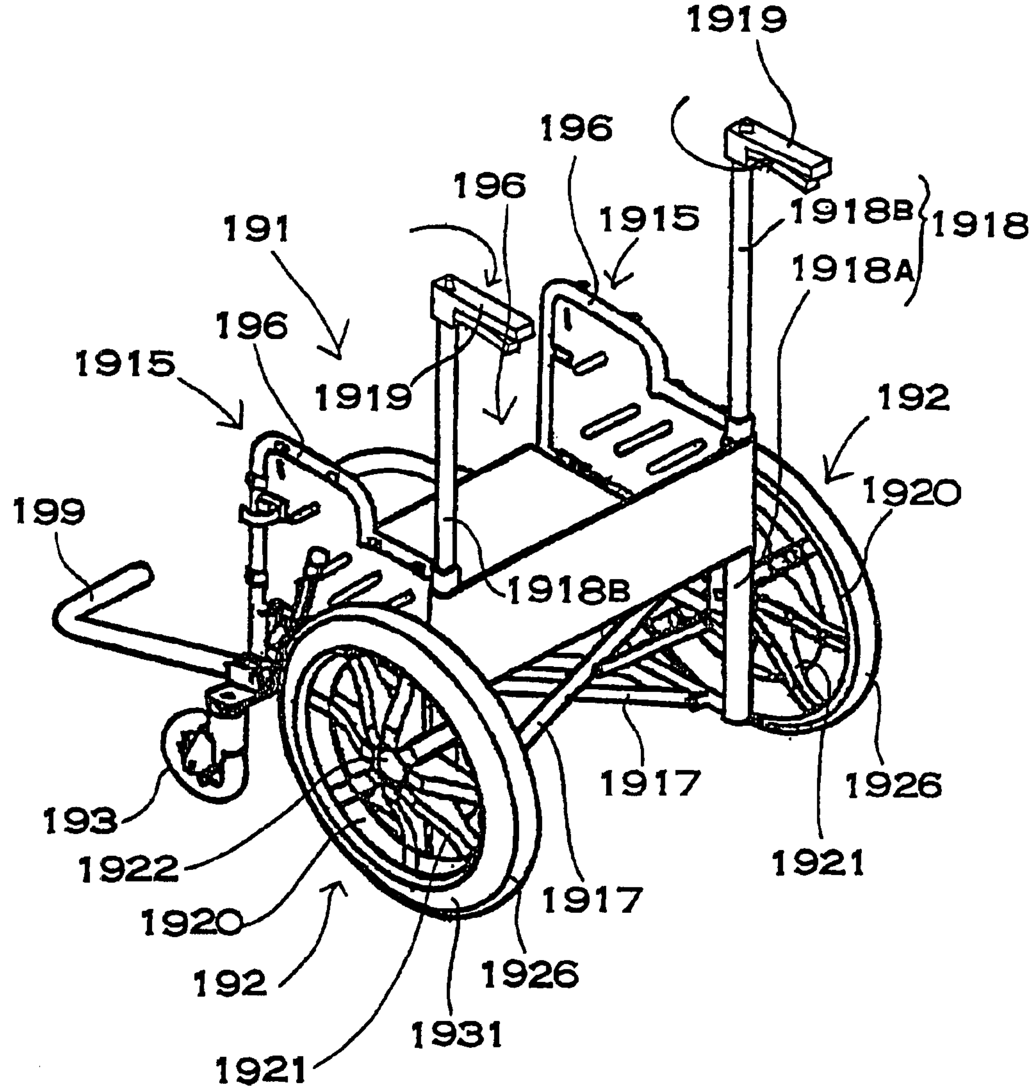
FIG. 21 is a rear perspective view of the grip of the wheel chair shown in FIG. 19, in which the grip is rotated 180 degrees.

Further, the chair part 191 fixes perpendicular pole 1918 in a standing position, provided on the back of the side frame 1915. The perpendicular pole 1918 is an extendable rod and it includes a grip 1919 on the upper end. The extendable perpendicular pole 1918 comprises fixed rod 1918A, telescopic motion rod 1918B into which the fixed rod 1918A is inserted in an extendable manner, and a stopper (not illustrated) that can stop in an extended position. The stopper has a structure that is able to stop the telescopic motion rod 1918B in a predetermined position. The grip 1919 is attached so as to be projecting in the horizontal direction from the upper end of perpendicular pole 1918. Further, as shown in FIG. 21 with an arrow, the grip 1919 is rotatable within a horizontal plane, from the position projecting forward to another position projecting backward, by rotating 180 degrees. This wheelchair is usable like a stick to support the operator's body stably in a state in which the grip 1919 projects forward by locating the grip 1919 forward relative to the axle of the wheel 192 and backward relative to free wheel 193. Further, as shown in FIG. 21, in the state in which the grip 1919 is rotated 180 degrees so as to projecting backward, the user sits on this wheelchair and his caregiver such as his family can push it from behind easily to move in a forward direction.

The wheelchair shown in FIG. 19 to FIG. 21 has a foldable construction to reduce its width, and also construction of the extendable perpendicular pole 1918 provided behind of the chair part 191, and the grip 1919 attached on the upper end of the perpendicular pole 1918, which is rotatable 180 degrees. It should be noted, although not illustrated, the wheelchair may employ another structure, which is not a foldable configuration, a configuration that does not have an extendable perpendicular pole, or a configuration that does not have a 180 degree rotatable grip. Further, the wheelchair according to the present invention can employ any construction such as already developed and/or used, or a future developed construction.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

This application is based on applications No. 2002-343026 filed in Japan on Nov. 26, 2002, and No. 2003-379091 filed in Japan on Nov. 7, 2003, the contents of which are incorporated hereinto by reference.

What is claimed is:

1. A wheelchair having a chair part on which a user can sit, and rotatable wheels provided on both sides of the chair part so as to be rotatable by hand for effecting movement of the wheelchair, each of the wheels comprising:

a rim member defining an outer periphery;

a hub member rotatably connected to the chair part, and connected at a center of the rim member via a wheel part, wherein the rim member is formed in a U-shape in a cross-sectional cut in a radial direction, the U-shape being defined by an inner sidewall positioned on the chair part side, an outer sidewall on an opposing side, and a connecting ring connecting the inner sidewall and the outer sidewall, and wherein the outer sidewall forms a continuous wall portion, and the continuous wall portion is formed in a ring shape at an outer side of the outer periphery of the rim member, and provides a grip ring on an edge portion thereof; and a cushion ring fixed on an outer peripheral surface of the connecting ring, wherein the inner sidewall is connected to the wheel part, the grip ring is provided on an edge portion of the outer sidewall, and the U-shaped rim member, which is formed by the inner sidewall, the connecting ring and the outer sidewall, forms a finger-holding cavity capable of receiving therein a user's fingers to rotate the wheel by gripping the grip ring.

2. A wheelchair as recited in claim 1, wherein the inner surface of the U-shaped rim member provides a surface condition that does not include any irregularity that might interfere with movement of the user's hand in the rotating direction.

3. A wheelchair as recited in claim 2, wherein a smooth plate is integrally formed on the inner surface of the U-shaped portion.

4. A wheelchair as recited in claim 3, wherein the rim member comprising the inner sidewall, the outer sidewall, the connecting ring and the smooth plate is formed integrally of a plastic material.

5. A wheelchair as recited in claim 1, wherein the continuous wall portion is either curved or angled toward the center of the wheel, and the grip ring on the edge portion is positioned on the center side relative to the outer periphery of the rim member.

6. A wheelchair as recited in claim 1, wherein the continuous wall portion has a maximum thickness (D) at the grip ring.

7. A wheelchair as recited in claim 1, wherein the cushion ring is formed of rubber.

8. A wheelchair having a chair part on which a user can sit, and rotatable wheels provided on both sides of the chair part so as to be rotatable by hand for effecting movement of the wheelchair, each of the wheels comprising:

a rim member defining an outer periphery;

a hub member rotatably connected to the chair part, and connected at a center of the rim member via a wheel member; and a cushion ring fixed on the outer periphery of the rim member, wherein the rim member includes a continuous wall portion on an outer side of the outer periphery;

wherein the continuous wall portion is formed in a ring shape along the rim member, and provides a grip ring on an edge portion thereof, wherein a finger-holding cavity is formed by the continuous wall portion, the finger-holding cavity being capable of receiving therein a user's fingers to rotate the wheel by gripping the grip ring, and wherein each of the wheels is curved from inside to outside in a direction from the rim member toward the hub member.

9. A wheelchair as recited in claim 8, wherein the rim member is formed in a U-shape in a cross-section cut in a radial direction, the U-shape being defined by an inner sidewall positioned on the chair part side, an outer sidewall on an opposing side, and a connecting ring connecting the inner sidewall and the outer sidewall, and the outer sidewall forms the continuous wall portion, and wherein the cushion ring is fixed on the outer peripheral surface of the connecting ring, the inner sidewall is connected to the wheel part, the grip ring is provided on an edge portion of the outer sidewall, and the U-shaped portion comprising the inner sidewall, the connecting ring and the outer sidewall forms the finger-holding cavity.

10. A wheelchair as recited in claim 9, wherein the inner surface of the U-shaped rim member provides a surface condition that does not include any irregularity that might interfere with movement of the user's hand in the rotating direction.

11. A wheelchair as recited in claim 10, wherein a smooth plate is integrally formed on the inner surface of the U-shaped portion.

12. A wheelchair as recited in claim 11, wherein the rim member comprising the inner sidewall, the outer sidewall, the connecting ring and the smooth plate is formed integrally of a plastic material.

13. A wheelchair as recited in claim 8, wherein the rim member comprises a ring member fixing the cushion ring on an outer periphery surface thereof, and the continuous wall portion is provided on the outer surface of the ring member, and wherein the finger-holding cavity is formed by the continuous wall portion and the ring member.

14. A wheelchair as recited in claim 13, wherein the outer surface of the ring member and the surface of the continuous wall portion define a surface condition that does not include an irregularity that might interfere with movement of the user's hand in the rotating direction.

15. A wheelchair as recited in claim 13, wherein the ring member and the continuous wall portion are formed integrally of a plastic material.

16. A wheelchair as recited in claim 8, wherein the continuous wall portion is either curved or angled toward the center portion of the wheel, and the grip ring is positioned on the center side relative to the outer peripheral edge of the rim member.

17. A wheelchair as recited in claim 8, wherein the continuous wall portion includes a connecting portion between the outer periphery of the rim member and the grip ring, and the continuous wall portion has a maximum thickness (D) at the grip ring and a minimum thickness (d) at the connecting portion.

18. A wheelchair as recited in claim 8, wherein the rim member, the wheel member, and the hub member are integrally formed in plastic.

19. A wheelchair as recited in claim 8, wherein the cushion ring is a rubber ring.

* * * * *